United States Patent
Jaquette et al.

(10) Patent No.: US 7,506,178 B2
(45) Date of Patent: Mar. 17, 2009

(54) TAMPER-RESISTANT RE-WRITABLE DATA STORAGE MEDIA

(75) Inventors: Glen A Jaquette, Tucson, AZ (US); Paul M Greco, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1005 days.

(21) Appl. No.: 10/838,807

(22) Filed: May 4, 2004

(65) Prior Publication Data

US 2005/0251695 A1    Nov. 10, 2005

(51) Int. Cl.
 *G06F 12/14*    (2006.01)
 *H04L 9/00*    (2006.01)
(52) U.S. Cl. ............................ 713/194; 380/44; 380/46
(58) Field of Classification Search ....................... None
 See application file for complete search history.

(56) References Cited

U.S. PATENT DOCUMENTS

| 6,745,166 | B1 * | 6/2004 | Sugahara et al. ............... 705/57 |
| 7,228,437 | B2 * | 6/2007 | Spagna et al. ................ 713/193 |
| 7,283,259 | B2 * | 10/2007 | Iwasaki ...................... 358/1.14 |
| 2003/0145183 | A1 * | 7/2003 | Muehring .................... 711/163 |

* cited by examiner

*Primary Examiner*—Kaveh Abrishamkar
(74) *Attorney, Agent, or Firm*—Dan Shifrin

(57) ABSTRACT

A cartridge handling system and method are provided to initialize a data storage cartridge having rewritable media and a cartridge memory for tamper resistant write once recording. During initialization of the cartridge for write once recording, selected data set information table fields of each data set are scrambled. The scrambling algorithm may employ a random number generator seeded with a unique cartridge identifier. The fields thus becomes unreadable if the unique identifier is changed, such as if the cartridge memory of the cartridge has been altered or replaced.

26 Claims, 5 Drawing Sheets

| CM Areas | | Access Restrictions |
|---|---|---|
| CM Manufacturer's Information | 30 | Lockable to Read-Only |
| CM Write Inhibit | 33 | |
| Protected Page Table | 36 | |
| Protected Pages | 35 | |
| Unprotected Page Table | 38 | Restricted Write |
| Unprotected Pages | 37 | Read/Write |
FIG. 3
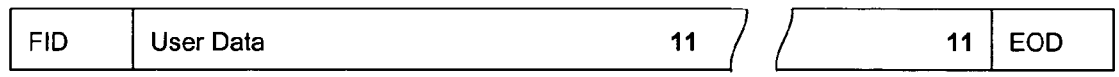
FIG. 4A
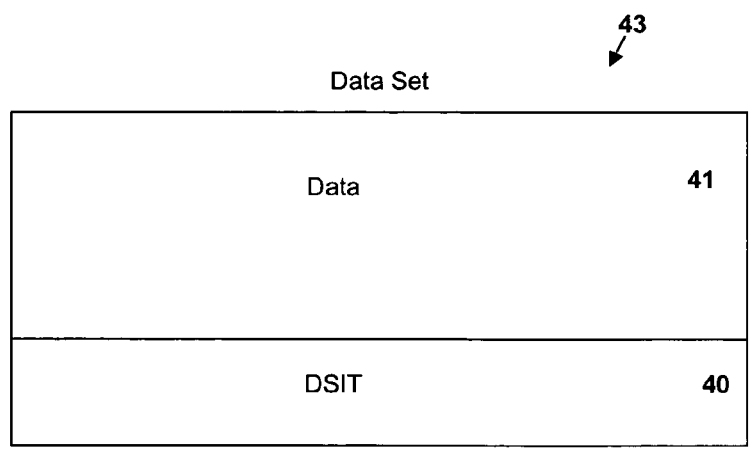
FIG. 4B

TAMPER-RESISTANT RE-WRITABLE DATA STORAGE MEDIA

TECHNICAL FIELD

This invention relates generally to write-once recording of re-writable media and, in particular, to protecting the media against tampering or intentional or unintentional overwriting of data.

BACKGROUND ART

Write once recording is a means of securing information at a particular point in time, which information may be archived for future reference. Some recording media is inherently write once, such as "WORM" (write once, read many) optical disk media. As an example, WORM optical disk media may comprise a material which is ablated when written and is therefore not subject to being erased and overwritten by new information. It is, however, subject to being destroyed if an attempt is made to overwrite previously written information. Other examples of write once optical disk recording media comprise non-reversible phase change and dye polymer WORM optical disk media. Thus, checks, such as microcode interlocks in a write-once optical disk drive, are employed to insure that a portion of a WORM optical disk that has been written is not overwritten and destroyed. Although the information may be destroyed, such as by ablating or distorting the media, the optical disk cannot be tampered with to alter the information by one with normal user resources.

By contrast, some media, such as magnetic tape, is inherently rewritable in that prior information can be erased and overwritten by new information. Various "write protect" devices are often employed to theoretically protect written data on the inherently rewritable media from being erased or overwritten. One example comprises the write protect tab on audio cassettes and video tape cartridges which may be broken off to expose an opening that is sensed by the tape drive which then prevents erasure or overwriting the tape. Another example is the write protect thumb wheel or slide on magnetic tape cartridges, such as the IBM 3590 magnetic tape cartridge, which may be rotated or repositioned to a write protect position. The position of the wheel or slide is detected by a tape data storage drive in which the cartridge is loaded. An example of a write protect sliding notch is illustrated in U.S. Pat. No. 6,134,066. The device disclosed in the patent allows a cartridge memory to be updated even though the cartridge media itself is write protected. Still another approach is to provide a write prevention flag recorded in a tape information area of the tape, such as illustrated in U.S. Pat. No. 5,493,455.

However, should someone wish to tamper with the cartridge and media to alter the data, a covering may be placed over the write protect opening, or the write protect thumb wheel or slide may simply be rotated or repositioned away from the write protect position. Further, a data storage drive may be operated to reset a write prevention flag off. Thus, someone with normal user resources and an intention of erasing or altering data may easily do so, and then may again set the write protect back to the protected position or state, leaving an impression that the original data remains intact.

Another possibility is to provide write once cartridges that have special mechanical aspects which interface with specially designed data storage drives. Although it is more difficult to alter such a cartridge to become read/write, such cartridges must be separately maintained for identification and used only in the instance that the data to be stored is desired to be stored in a write once cartridge. As the result, such write once cartridges are less convenient for a user in a mixed cartridge environment.

The protections afforded by the above-described methods may be bypassed with relative ease. And, in fact, it may even be possible to alter recorded data and reset the protection, thereby leaving the data appearing to be original. A more advanced option provides an increased level of security and is described in commonly-assigned and co-pending U.S. application Ser. No. 10/440,694, filed May 19, 2003 and incorporated herein by reference in its entirety. A cartridge handling system and method initialize a data storage cartridge having rewritable media and a cartridge memory for tamper resistant write once recording. A write-once flag is written to a lockable section of the cartridge memory which also stores a cartridge memory serial number. Once the flag is written, the section is locked to be read-only. A write-once flag and the serial number are also written to a required data set of the rewritable media. Thus, both appear in both locations of the cartridge. In a further embodiment, the rewritable media has a prerecorded media identifier which is written to the cartridge memory along with the write once flag. Any attempt to rewrite data is said to be prevented because the write once flag and serial number are stored in both locations. Any attempt to alter the cartridge memory, move the media or copy its contents to another cartridge is also said to be prevented because the cartridge serial number in the cartridge memory would be different from that recorded to the media.

While the forgoing method decreases the risk of tampering, a risk still remains. First, a write once flag may be altered. Second, it may be possible to replace the cartridge memory of an initialized cartridge with an uninitialized cartridge memory. If the cartridge is then inserted into a drive after read circuits have been tampered with, the drive may determine that the cartridge is an uninitialized WORM cartridge and overwrite data on the cartridge.

Consequently, a need remains for improving the tamper-resistance of re-writable media written in a write once format.

SUMMARY OF THE INVENTION

The present invention provides a cartridge handling system and method which initialize a data storage cartridge having rewritable media for tamper resistant write once recording. The present invention also provides a cartridge handling system and data storage drive which accommodate an initialized cartridge and reject cartridges that may have been tampered with. The data storage cartridges have a cartridge shell housing rewritable media, such as magnetic tape, and a cartridge memory. Each cartridge is identified by a unique identifier constructed from the cartridge serial number, read from the cartridge memory, and other elements recorded on the media during the manufacture of the media. The media is formatted into data sets, each having an identifying data set number and an associated data set information table (DSIT).

During initialization of the cartridge for write once read many (WORM) recording, write once flags are set and selected fields of each DSIT are scrambled. In one embodiment, the scrambling algorithm may employ a random number generator seeded with the unique cartridge identifier. After initialization, the write once flags prevent an attempt to change or overwrite data by a storage drive operating in a re-writable mode. Moreover, if an attempt is made to bypass the write once flags, such as by altering or replacing the cartridge memory of the cartridge to change the unique identifier, the selected fields cannot be unscrambled and are unreadable, thus preventing tampering.

BRIEF DESCRIPTION OF THE DRAWINGS

FIG. 3 is a diagrammatic representation of the contents of a cartridge memory of FIG. 1, together with the access restrictions for the cartridge memory contents in accordance with the present invention;

FIGS. 4A and 4B are, respectively, a diagrammatic representation of a media of a data storage cartridge of FIG. 1;

DETAILED DESCRIPTION OF THE PREFERRED EMBODIMENT

Figure 1:
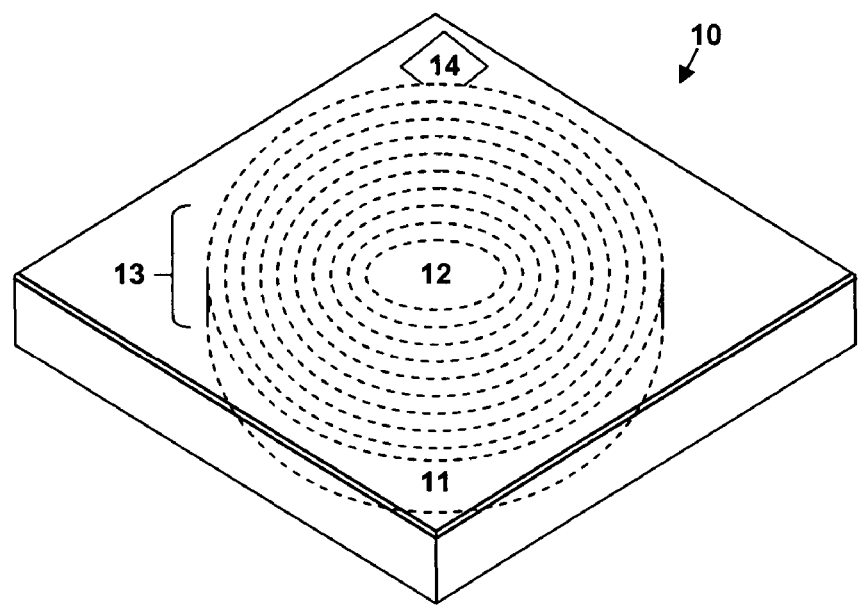
FIG. 1 is an isometric view of a data storage cartridge with a media and a cartridge memory shown in phantom.

Referring to FIG. 1, a data storage cartridge 10 is illustrated which comprises a rewritable data storage media 11, such as a magnetic tape wound on a hub 12 of a reel 13 and a memory circuit 14 (referred to hereinafter as cartridge memory). One example of a magnetic tape cartridge comprises a cartridge based on LTO (Linear Tape Open) technology. The cartridge memory 14, for example, comprises a transponder having a contactless interface, which is retained in the cartridge 10, for example, by being encapsulated by the cartridge when it is assembled, as is understood by those of skill in the art.

Figure 2:
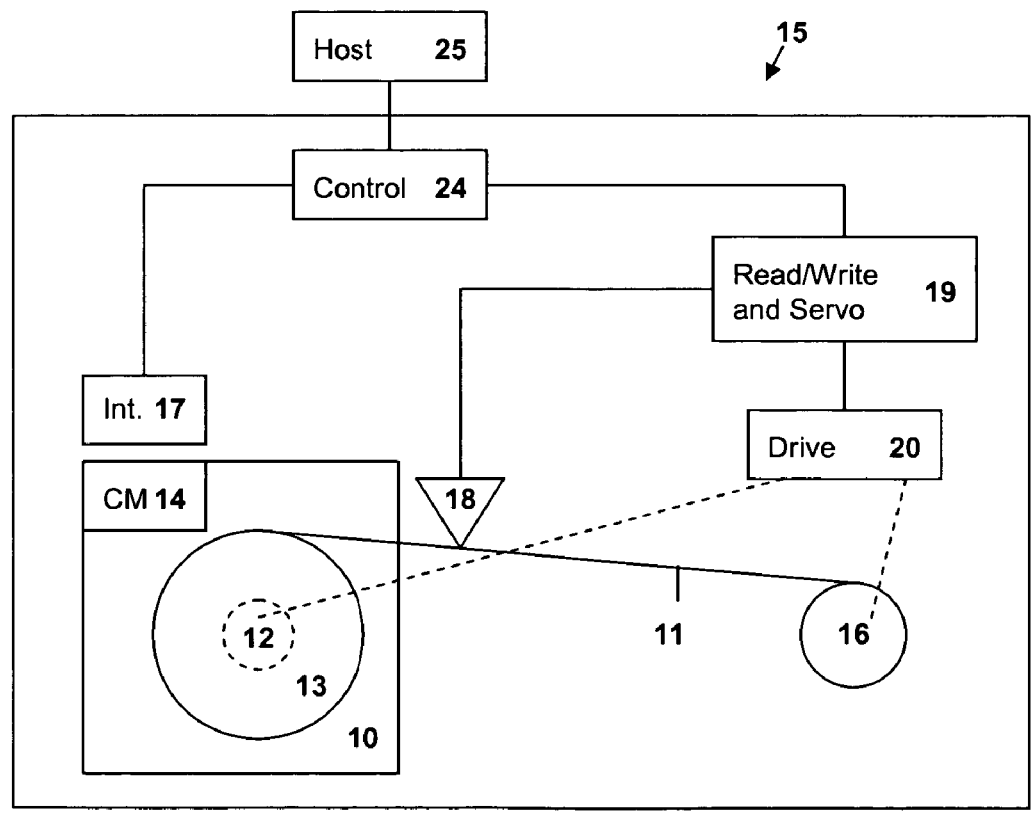
FIG. 2 is a block diagrammatic representation of a cartridge handling system, such as a data storage drive for handling the data storage cartridge of FIG. 1.

Referring to FIG. 2, a cartridge handling system 15, such as a magnetic tape data storage system, is illustrated. One example of a magnetic tape data storage system in which the present invention may be employed is the IBM 3580 Ultrium magnetic tape subsystem based on LTO technology, with microcode to perform initialization of the data storage cartridge 10.

Data storage cartridges may comprise magnetic tape, optical tape, or optical or magnetic disk. Magnetic tape cartridges will be used herein to illustrate the present invention; however, the present invention is also applicable to other forms of rewritable storage media and is not limited to use with magnetic media. Magnetic tape cartridges may comprise dual reel cartridges, in which the tape is fed between reels within the cartridge, or may comprise single reel cartridges, such as illustrated in FIGS. 1 and 2, in which the media 11 is wound on a reel 13 within the cartridge 10. When the cartridge is loaded in the cartridge handling system 15, the tape is fed between the cartridge reel and a take up reel 16 in the cartridge handling system 15.

The cartridge handling system comprises a memory circuit interface 17 for reading information from, and writing information to, the cartridge memory 14 of the data storage cartridge 10 in a contactless manner. The cartridge handling system further includes a read/write system for reading information from, and writing information to, the rewritable media. The read/write system comprises a read/write and servo head 18, a servo system for moving the head laterally relative to the magnetic tape media 11, a read/write and servo control 19 and a drive motor system 20 which moves the magnetic tape media across the read/write and servo head 18 between the reels 13 and 16. The read/write and servo control 19 controls the operation of the drive motor system 19 to move the magnetic tape media 11 across the read/write and servo head 18 at a desired velocity, and stops, starts and reverses the direction of movement of the magnetic tape.

The illustrated and alternative embodiments of cartridge handling systems are known to those of skill in the art, including those which employ two reel cartridges.

A control system (or controller) 24 communicates with the memory interface 17, and communicates with the read/write system, e.g., at read/write and servo control 19. The control system 24 also typically communicates with one or more host systems 25 and operates the cartridge handling system 15 in accordance with commands originating at a host. As illustrated, the cartridge handling system performs a variety of functions: initializing a cartridge 10 as a WORM cartridge in accordance with an embodiment of the present invention; functioning as a conventional data storage drive to write data to and read data from the cartridge media; and testing a cartridge 10 for valid WORM initialization.

FIG. 3 illustrates the contents 28 of an exemplary cartridge memory 14. One example of a cartridge memory 14 of FIG. 2 and its content is described in Standard ECMA-319, June 2001, "Data Interchange on 12.7 mm 384-Track Magnetic Tape Cartridges—Ultrium-1 Format", Annex D—LTO Cartridge Memory, pp. 95-115. The cartridge memory 14 of FIG. 2 may be similar to the memory and transponder used in "smart cards" as are known to those of skill in the art.

In the embodiment of FIG. 3, the cartridge memory is arranged in areas of various sizes with information organized into "pages". The definitions herein differ slightly from that of the above ECMA document, in that the cartridge memory herein is divided into "areas", whereas they are called "sections" in the ECMA document. The term "section" as defined herein refers to the portion of the cartridge memory which is lockable to read-only. Any terminology suitable to those of skill in the art may be substituted for "area", for "page", and for "section" as employed herein. The specific layout of the areas and content of each area may be altered as is known to those of skill in the art.

Certain areas of the cartridge memory, such as area 36, are originally writable and may be read, but are within a section that is lockable to read-only. One area 30 comprises information provided for or by the manufacturer of the cartridge memory. Access restrictions to the various areas 38 of the cartridge memory 14 are indicated in column 31 in FIG. 3. Thus, in the illustrated embodiment, area 30 for manufacturer's information is shown as within the section lockable to read-only.

Another area 33 is the location for a write inhibit code, which, when implemented, locks the lockable section of the cartridge memory and converts the "lockable to read-only" areas to read-only. As one example, a write inhibit code may comprise a set of characters or, as another example, a write inhibit code may comprise a single bit in a given location. When the lockable section is locked, the write inhibit code of the write inhibit code area 33 itself cannot be over written but is read-only, as shown in column 31. Thus, the write inhibit code may not be retracted and once a cartridge memory is initialized and locked, it cannot be reinitialized. Alternatively, a locking pointer may be employed which degates write access to the section of the memory before the address specified by the pointer, similar to the operation of "smart cards". Thus, the pointer itself is locked and cannot be changed; the pointer additionally specifies an address range below which nothing else may be updated. For example, this pointer may be in area 33, but the pointer may specify that a different area 38 and some pages nominally defined as "unprotected" pages are to be locked, preventing them from being updated.

Another area 35 comprises pages that are protectable in that they are also lockable to read-only as indicated by column 31. Area 36 comprises a table describing the contents of the protectable area 35, and is itself also protectable. Another area 37 comprises pages that may be written as well as read and are not typically protected to read-only, as indicated in column 31; a last area 38 comprises a table describing the contents of unprotected area 37. As discussed in the above ECMA document, the unprotected area 37 comprises information which is continually updated during usage of the cartridge. Area 38 does not need to be updated after cartridge initialization unless a cartridge memory page is relocated or changed in size. However, a given implementation may not require that the contents of the area 38 change and thus could lock the area 38, shown as a "restricted write" in FIG. 3. Thus, areas 30-36 are lockable to read-only and comprise a "lockable read-only section" of the cartridge memory.

The manufacturer's information area 30 of the cartridge memory 14 includes a cartridge memory serial number which identifies the specific cartridge memory 14. The cartridge memory serial number is typically written in the lockable section of the cartridge memory by the manufacturer of the cartridge memory and may be locked by a mechanism independent of the area 33 write inhibit. The cartridge memory 14, with the cartridge memory serial number, is retained in the cartridge. Additional information is obtained which is based on such identifying elements as (when magnetic tape is the storage media) a tape pancake identifier (established and recorded when the tape is manufactured and split for winding onto cartridge reels) and one or more logical position identifiers obtained by reading servo tracks. The cartridge memory serial number and the additional information is assembled by the controller 24 of the cartridge handling system 15 into unique identifier, know as a world wide cartridge identifier (WWCID). The WWCID is reconstructed each time a cartridge 10 is loaded into a cartridge handling system 15. Consequently, the cartridge WWCID is a substantially unique identification of the cartridge and media and is employed in accordance with the present invention as a means of providing tamper resistant write once recording.

The control system 24 also causes the memory interface 17 to write a write-once flag to the lockable section of the cartridge memory 14 indicating that the tape in the cartridge is to be used for write once (WORM) recording only. As an example, the write-once flag may be written to a protected page of area 35, which, when section 30-36 is locked to read-only, becomes fixed. Next, the control system 24 causes the memory interface 17 to lock the lockable section of the cartridge memory to read-only.

Optionally, the write flag pointer of area 33 may be changed to guard the unprotected page table of area 38 and some pages nominally defined as "unprotected pages", preventing them from being updated. As an example, an initialization data page may be locked which still allows the cartridge to be usable, but prevents landmarks recorded in an initialization data page from being moved.

Referring now to FIGS. 4A and 4B, the control system 24 directs the read/write system 18-20 to write at least a write-once flag to a required data set of the rewritable media. In one embodiment, the required data set is required as a part of the initialization of the cartridge, and is required for use of the cartridge.

A data set information table ("DSIT") 40 (FIG. 4B) associated with each data set 43 describes the content of the data set with numerous fields, including a field containing an identifying number of the data set (data set number). Some of the DSIT fields of a cartridge initialized for WORM recording are different from fields of a cartridge initialized for conventional re-writable recording. Moreover, by virtue of the information contained in each DSIT, a DSIT must be read by a cartridge handling system in order for the associated data set (including customer data 41) to be read.

In accordance with the present invention, one or more fields of each DSIT of a WORM-formatted cartridge are scrambled to reduce the risk of undetected tampering. More specifically, scrambling one or more DSIT fields while initializing a cartridge indicates that data written to the cartridge is a WORM data. Drives which are unable to unscramble the fields will be unable to read the critical values required to read process data within a data set and such a drive will be placed in a read only mode and will be prevented from altering the data. Scrambling all of the DSIT fields provides a high degree of security but at the cost of slower processing speed and the converse is also true. Consequently, a tradeoff is made between security and processing speed and typically a selected number of the DSIT fields will be scrambled, but not all.

In one embodiment, a predetermined pseudo-random number may be applied to the field or fields of each DSIT which are to be scrambled in a logical operation. In another embodiment, one or more portions (such as one or more bytes) of the WWCID may be applied to the fields to be scrambled in a logical operation. In a further embodiment, a pseudo-random number generated from the WWCID may be applied to the fields to be scrambled in a logical operation. In still a further embodiment, a scrambling algorithm may be employed which generates a different value for each different data set. An encrypting algorithm (such as triple-DES) may alternatively be employed. Although a hardware state machine may be employed to scramble the selected DSIT field(s), performing a software-based logical operation, and in particular an exclusive-OR, is preferred.

Figure 5:
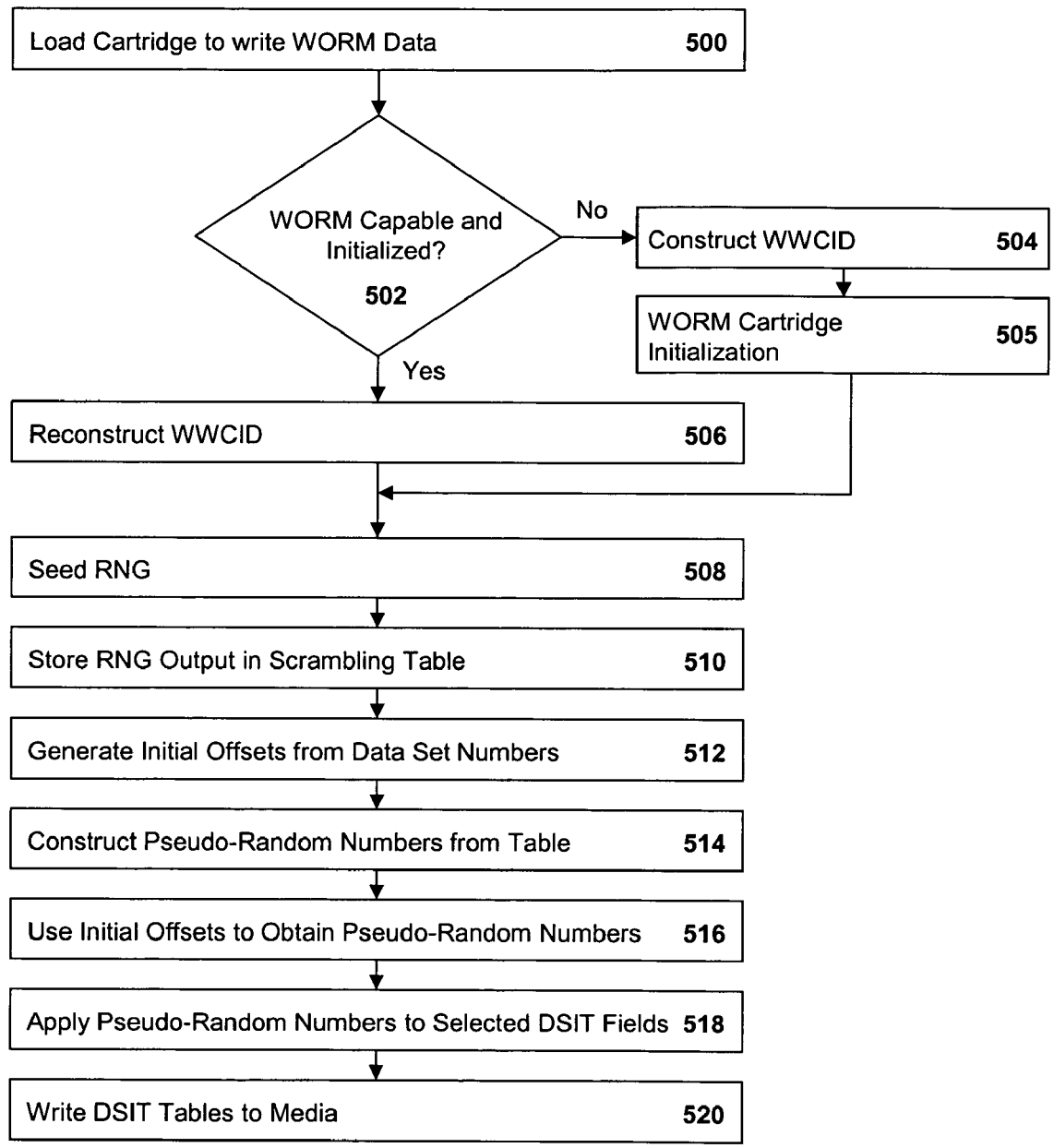
FIG. 5 is a flow chart depicting an embodiment of the method of the present invention for initializing and writing to a data storage cartridge as a WORM cartridge.
Figure 6:
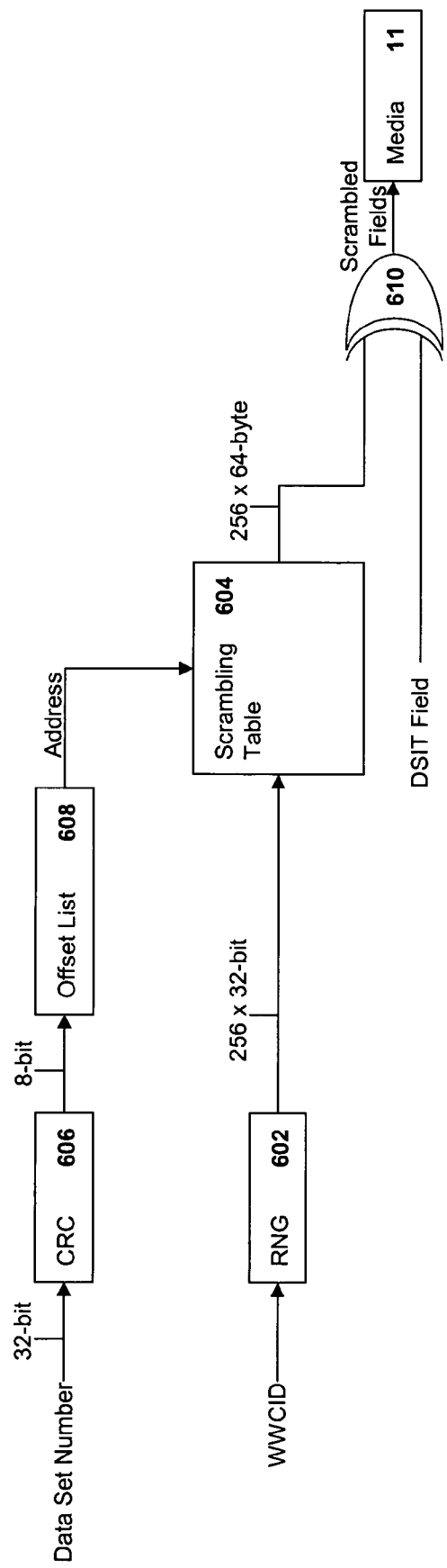
FIG. 6 is a functional diagram of the embodiment of the present invention depicted in the flow chart of FIG. 5.

FIG. 5 is a flow chart depicting an embodiment of the method of the present invention for initializing a data storage cartridge as a WORM cartridge. A cartridge 10 is loaded into a data storage drive of a cartridge handling system 15 (step 500). The control system 24 determines whether the cartridge is WORM capable and is uninitialized (step 502). As an example, a cartridge may already be initialized in another form which retains the rewritable capability, and therefore does not match either determination. If the cartridge is not WORM capable or is not uninitialized, the process is terminated for that cartridge (step 504). If the cartridge is WORM capable and is uninitialized, the controller 24 reconstructs the WWCID from its various components (step 506) read from the cartridge memory 14 and the storage media 11. Referring also to FIG. 6, the WWCID is used to seed a random number generator 602 (such as a subroutine in the code executed by the controller 24) (step 508). The output of the random number generator comprise 1024 sequential numbers which are stored as 256 32-bit entries of a scrambling table 604 (step 610). It will be appreciated that the output of the random number generator may be arranged differently.

The data set number of each data set is processed to produce an initial offset list 606 into the scrambling table (step 512). For example, one method for producing an initial offset from a data set number is to calculate a one-byte CRC (cyclical redundancy check) 608 with a non-zero alpha term, thereby effectively converting a 32-bit number into an 8-bit number. Although such a process will generate all 256 possible outputs, the outputs are non-sequential. Consequently, the initial offset into the scrambling table jumps around in a pseudo-random manner from one data set to the next.

After the initial offsets are calculated, a different 64-byte pseudo-random number is generated for each data set (step 514). This is performed by obtaining sixteen sequential 32-bit table entries which are combined into a 64-byte string. If only the least significant byte of each incrementing address (initial offset) is used to address the scrambling table, the process is modulo 256 and the results do not index out of the table. Because the random number generator is seeded with the WWCID, which is unique for each cartridge, the resulting 256 64-byte pseudo-random strings are different for each cartridge. It will be appreciated that other algorithms may also be used.

As noted, each of the pseudo-random strings is associated with one of the data sets through the introduction of the data set numbers into the calculation of the initial offsets in to the scrambling table. The initial offsets are then used to obtain the pseudo-random number strings for each data set (step 516). Each string is then applied to the selected fields of the associated DSIT (step 518), preferably in a logical operation. One such field which may be scrambled is the data set number field. For example, selected bytes of the pseudo-random string may be compared with the selected fields in an exclusive-OR (XOR) operation 610. Because DSIT fields may be different lengths, the number of bytes of the pseudo-random string selected to be XOR'd with a particular field each should be the same length. When the scrambling procedure is being established, a DSIT "template" may be used to determine which fields are to be scrambled and with what bytes of the pseudo-random string. In the template, each row represents a different field, with the name of the field indicated in one of the columns. Another column indicates an offset in bytes of each field from the beginning of the DSIT, another column indicates the length of each field and a final column indicates whether the field is XOR'd and, if so, with what byte of the pseudo-random number string generated by the random number generator. It will be appreciated that the exclusive-OR operation is employed because when the result is applied to one of the original operands, the other operand is recovered.

In alternative embodiments, some or all of the bytes of DSIT may be XOR'd with a pseudo-random number or selected fields may be XOR's with the WWCID itself.

In another embodiment, the scrambled fields may be relocated in the DSIT, with the new offset being determined by the WWCID or pseudo-random string such that the new location is different for each WORM cartridge. Moreover, a nominal or invalid value may be inserted in the original location of a relocated field, thereby preventing a read/write drive from further processing of the DSIT and customer data.

After the DSIT fields have been scrambled, they are written on the storage media 11 (step 520) and data may then be recorded.

Figure 7:
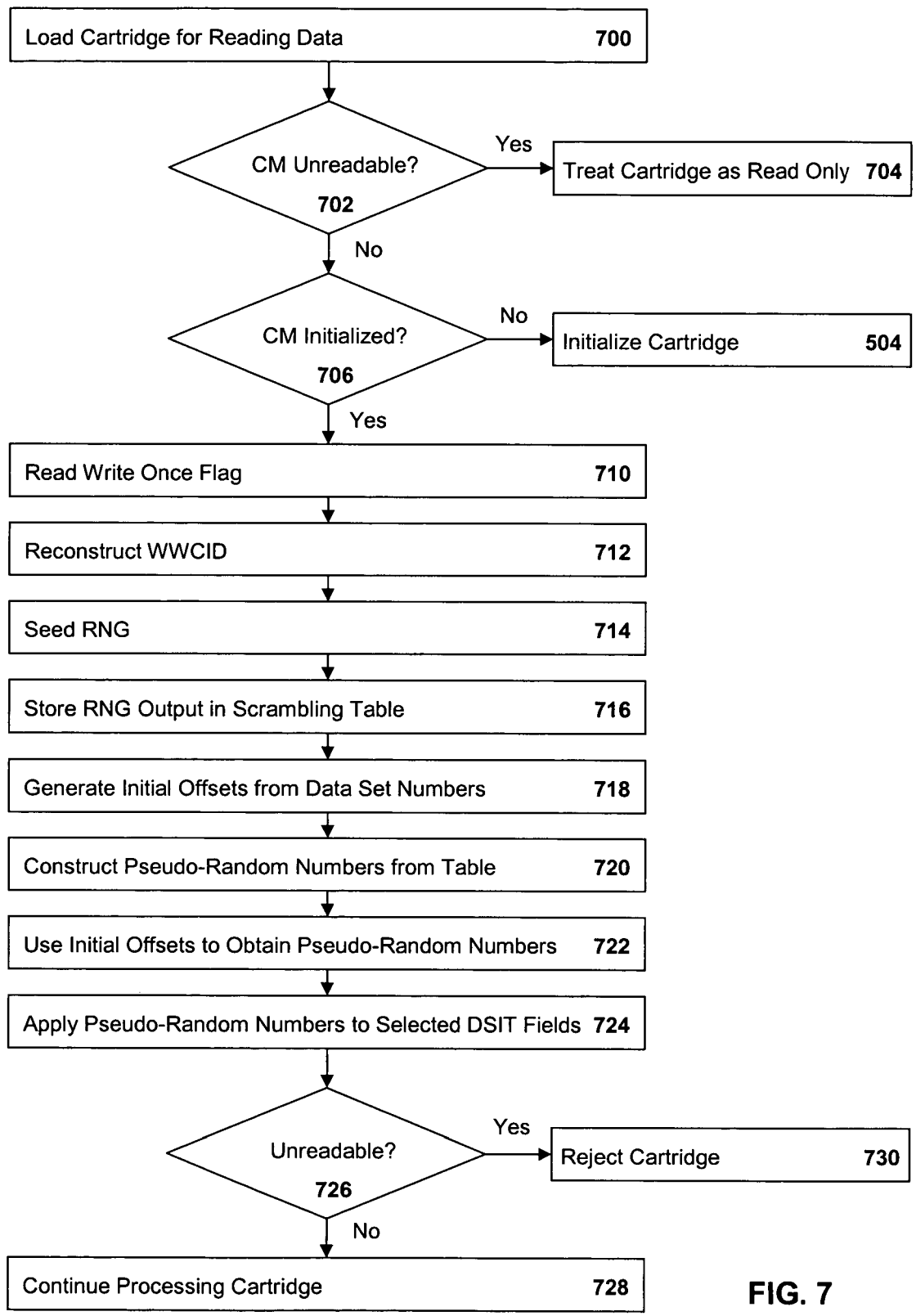
FIG. 7 is a flow chart depicting an embodiment of the method of the present invention for testing a cartridge for valid WORM initialization.

FIG. 7 is a flow chart depicting an embodiment of the method of the present invention for testing a cartridge for valid WORM initialization. Because it is essentially the reverse of the initialization procedure, only a summary will be provided. The test is conducted by a data storage drive that is WORM capable although the data storage drive may differ from the cartridge handling system that initializes cartridges, such as by omitting the initialization microcode of the control system. A cartridge 10 is loaded into a data storage drive (step 700). The control system 24 causes the memory interface to determine whether the cartridge memory 14 is readable (step 702). If it is unreadable, such as if it is defective or missing, the cartridge is treated as read-only (step 704). Otherwise, the controller 24 determines whether the cartridge memory 14 is initialized (step 706). If not, the cartridge is initialized in accordance with FIG. 5. Otherwise, the write once flag is read (step 710) to be sure that it is set to the write once position. The controller 24 reconstructs the WWCID from it components (step 712). The WWCID is used to seed the random number generator (step 714). As during the initialization phase, the output of the random number generator is used to populate the scrambling table (step 716) and the data set number of each data set is processed to produce the initial offset into the scrambling table (step 718). After the initial offsets are calculated, a different 64-byte pseudo-random number is generated for each data set (step 720). Because the same algorithms are used to test a cartridge for valid WORM initialization as were used during initialization, the contents of the scrambling table and the initial offsets will be the same if the WWCID of the cartridge is the same.

The initial offset associated with each DSIT (based on the data set number) is then used to obtain the corresponding pseudo-random string from the scrambling table (step 722). That string is applied to the appropriate DSIT field (step 724) in the same logical XOR operation as was used during initialization. If the WWCID of the cartridge is the same as the WWCID which was used during initialization of the cartridge (step 726), the fields will be properly unscrambled and the cartridge may continue to be processed (step 728). On the other hand, it the WWCID is different (such as will occur if the original initialized cartridge memory is replaced with a different, uninitialized or read/write cartridge memory in an attempt to overcome the WORM protection of the media or if the contents of a cartridge are copied onto a different cartridge), the scrambled DSIT fields will remain unreadable, any attempt to write modified data to the media will be prevented and the cartridge will be rejected (step 730).

In order to prevent a data storage handling system from being modified to try more than one WWCID during WORM validation, the controller 24 may be programmed with instructions that only the WWCID from the loaded cartridge be used.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method for rendering re-writable data storage media substantially tamper-resistant, comprising:
    loading an uninitialized data storage cartridge into a first data storage drive, the data storage cartridge housing a re-writable storage medium and a cartridge memory;
    reconstructing a read-only cartridge identifier from information read from the cartridge memory;
    using the cartridge identifier to scramble the contents of at least one predetermined field of each of at least one data set information table (DSIT) to indicate that data written to the medium is write-once data, each DSIT being associated with a corresponding data set of customer data;
    recording the DSIT fields to the medium to initialize the data storage cartridge; and
    recording the corresponding data set to medium;
    whereby, when the initialized data storage cartridge is loaded into a second data storage drive, the cartridge identifier is reconstructed from information read from the cartridge memory and the contents of the at least one scrambled DSIT fields are restorable to their unscrambled state only if the cartridge identifier has not been altered, thereby rendering the customer data sets readable.

2. The method of claim 1, wherein scrambling the contents of the at least one DSIT field comprises:
seeding a random number generator with the cartridge identifier to generate a scrambling table of first pseudo-random numbers;
processing a data set number of each data set to obtain an initial offset into the scrambling table;
using the initial offset to obtain a table entry for each data set;
using the obtained table entries to generate a different second pseudo-random number for each data set; and
for each data set, applying the second pseudo-random number to the at least one predetermined DSIT field to scramble the contents of the at least one predetermined DSIT field.

3. The method of claim 1, wherein scrambling the contents of the at least one predetermined DSIT field comprises applying a number to the contents of the at least one predetermined DSIT field in a logical operation.

4. The method of claim 3, wherein the applied number is a number selected from the group consisting of at least one byte of the cartridge identifier read from the cartridge memory and a pseudo-random number generated from the identifier.

5. The method of claim 3, wherein the logical operation is an exclusive-or operation.

6. The method of claim 1, further comprising:
generating a pseudo-random number from the cartridge identifier;
applying the pseudo-random number to a DSIT table offset of the at least one predetermined DSIT field to be scrambled to calculate a new DSIT table offset; and
relocating the at least one predetermined DSIT field in the DSIT in accordance with the new DSIT table offset.

7. The method of claim 1, wherein the data storage cartridge is a data storage tape cartridge.

8. A data storage drive for processing data read from or written to a re-writable storage medium housed in a data storage cartridge, the data storage drive comprising:
a cartridge memory interface for reading information from and writing information to a cartridge memory housed in a data storage cartridge loaded in the data storage drive;
reading/writing means for reading data from and writing data to the storage medium housed in the data storage cartridge; and
a controller coupled to the cartridge memory interface and the reading/writing means, the controller being configured to:
determine if the loaded data storage cartridge is initialized;
if the data storage cartridge is uninitialized:
reconstruct a read-only cartridge identifier from information read from the cartridge memory;
use the cartridge identifier to scramble the contents of at least one of predetermined field of each of at least one data set information table (DSIT) to indicate that data written to the medium is write-once data, each DSIT being associated with a corresponding data set of customer data;
direct the reading/writing means to record the DSIT fields to the medium to initialize the data storage cartridge; and
direct the reading/writing means to record the corresponding data set to the medium; and if the data storage cartridge is initialized:
reconstruct the cartridge identifier from information read from the cartridge memory;
direct the reading/writing means to read the DSIT fields from the media;
use the cartridge identifier to scramble attempt to unscramble the contents of the at least one predetermined DSIT field;
if the contents of the at least one predetermined DSIT field are unscrambled, direct the reading/writing means to read the corresponding customer data set; and
if the contents of the at least one DSIT field are not unscrambled, reject the data storage cartridge.

9. The data storage drive of claim 8, wherein the controller is further configured to, when scrambling the at least one DSIT field:
seed a random number generator with the cartridge identifier to generate a scrambling table of first pseudo-random numbers;
process a data set number of each data set to obtain an initial offset into the scrambling table;
use the initial offset to obtain a table entry for each data set;
use the obtained table entries to generate a different second pseudo-random number for each data set; and
for each data set, apply the second pseudo-random number to the at least one predetermined DSIT field to scramble the contents of the at least one predetermined DSIT field.

10. The data storage drive of claim 9, wherein the controller is further configured to, when generating the scrambling table:
seed a random number generator with a number selected from the group consisting of at least one predetermined byte of the cartridge identifier read from the cartridge memory and a pseudo-random number generated from the cartridge identifier; and
populate the scrambling table with the output from the random number generator.

11. The data storage cartridge of claim 10, wherein the controller is further configured to, when attempting to unscramble the contents of the at least one DSIT field:
seed the random number generator with the at least one predetermined byte of the cartridge identifier reconstructed from information read from the cartridge memory;
re-populate the scrambling table with the output from the random number generator;
process a data set number of each data set to obtain an initial offset into the scrambling table;
use the initial offset to obtain a table entry for each data set;
use the obtained table entries to generate a different second pseudo-random number for each data set; and
for each data set, apply the second pseudo-random number to the at least one predetermined DSIT field to attempt to unscramble the contents of the at least one predetermined DSIT field.

12. The data storage drive of claim 9, wherein the controller is further configured to:
apply the second pseudo-random number to a DSIT table offset of the at least one predetermined DSIT field to be scrambled to calculate a new DSIT table offset; and
relocate the at least one predetermined DSIT field in the DSIT in accordance with the new DSIT table offset.

13. The data storage drive of claim 9, wherein the controller is further configured to, when applying the second pseudo-random number, apply the second pseudo-random number to the contents of the at least one predetermined DSIT field in a logical operation.

14. The data storage drive of claim 13, wherein the logical operation is an exclusive-or operation.

15. The data storage drive of claim 9, further comprising a state machine through which the controller generates the scrambling table of first pseudo-random numbers.

16. The data storage drive of claim 8, wherein the data storage cartridge is a data storage tape cartridge.

17. A method for processing a re-writable storage medium for write-once protection, comprising:
loading an uninitialized data storage cartridge into a first data storage drive, the data storage cartridge housing a re-writable storage medium and a cartridge memory;
while the data storage cartridge is loaded in the first data storage drive:
reconstructing a read-only cartridge identifier from information retained in the cartridge memory;
using the cartridge identifier to scramble the contents of at least one predetermined field of each of at least one data set information table (DSIT) to indicate that data written to the medium is write-once data, each DSIT being associated with a corresponding data set of customer data;
recording the DSIT fields to the medium to initialize the data storage cartridge;
recording at least one corresponding data set to the medium;
loading the data storage cartridge into a second data storage drive;
while the data storage cartridge is loaded in the first data storage drive:
reconstruct the cartridge identifier from information read from the cartridge memory;
reading the DSIT fields from the medium;
using the cartridge identifier to attempt to unscramble the contents of the at least one predetermined DSIT field;
if the contents of the at least one predetermined DSIT field are unscrambled, reading the corresponding customer data set; and
if the contents of the at least one DSIT field are not unscrambled, rejecting the data storage cartridge.

18. The method of claim 17, wherein scrambling the contents of the at least one DSIT field comprises:
seed a random number generator with the cartridge identifier to generate a scrambling table of first pseudo-random numbers;
processing a data set number of each data set to obtain an initial offset into the scrambling table;
using the initial offset to obtain a table entry for each data set;
using the obtained table entries to generate a different second pseudo-random number for each data set; and
for each data set, applying the second pseudo-random number to the at least one predetermined DSIT field to scramble the contents of the at least one predetermined DSIT field.

19. The method of claim 18, wherein generating the scrambling table comprises populating the scrambling table with the output from a state machine.

20. The method of claim 17, wherein scrambling the contents of the at least one predetermined DSIT field comprises applying a number to the contents of the at least one predetermined DSIT field in a logical operation.

21. The method of claim 20, wherein the applied number is a number selected from the group consisting of at least one byte of the cartridge identifier read from the cartridge memory and a pseudo-random number generated from the cartridge identifier.

22. The method of claim 20, wherein the logical operation is an exclusive-or operation.

23. The method of claim 17, further comprising:
scrambling a DSIT table offset of the at least one predetermined DSIT field to calculate a new DSIT table offset; and
relocating the at least one predetermined DSIT field in the DSIT in accordance with the new DSIT table offset.

24. The method of claim 17, wherein the data storage cartridge is a data storage tape cartridge.

25. A computer program product of a computer readable storage medium usable with a programmable computer, the computer program product having computer-readable code embodied therein for initializing a re-writable data storage medium in a write-once format, the data storage medium housing within a cartridge loaded into a first data storage drive, the cartridge having a cartridge memory, the computer-readable code comprising instructions for:
reconstructing a read-only cartridge identifier from information retained in the cartridge memory;
using the cartridge identifier to scramble the contents of at least one predetermined field of each of at least one data set information table (DSIT) to indicate the data written to the medium is write-once data, each DSIT being associated with a corresponding data set of customer data;
recording the DSIT fields to the medium to initialize the data storage cartridge; and
recording the one corresponding data set to the medium;
whereby, when the initialized data storage cartridge is loaded into a second data storage drive, the cartridge identifier is reconstructed from information read from the cartridge memory and the contents of the at least one scrambled DSIT fields are restorable to their unscrambled state and only if the cartridge identifier has not been altered, thereby rendering customer data sets readable.

26. The program product of the computer readable storage medium of claim 25, wherein the instructions for scrambling the contents of at least one DSIT field comprise instructions for:
populating a scrambling table with a plurality of first pseudo-random numbers output from the random number generator;
processing a data set number of each data set to obtain an initial offset into the scrambling table;
using the initial offset to obtain a table entry for each data set;
using the obtained table entries to generate a different second pseudo-random number for each data set; and
for each data set, applying the second pseudo-random number to the at least one predetermined DSIT field to scramble the contents of the at least one predetermined DSIT field in a logical operation.

* * * * *